3,128,152
PROCESS FOR RECOVERING HYDROGEN FLUORIDE FROM AQUEOUS FLUOSILICIC ACID SOLUTION
Robert N. Secord, Wenham, and Clifford Le Roy Carpenter, Wellesley, Mass., assignors to Cabot Corporation, Boston, Mass., a corporation of Delaware
No Drawing. Filed Oct. 10, 1961, Ser. No. 144,071
3 Claims. (Cl. 23—153)

This invention relates to the recovery of fluorine from fluosilicic acid and in particular to the recovery of fluorine from fluosilicic acid in the form of hydrogen fluoride.

The phosphoric rock fertilizer industry has long been plagued by the problem of what to do with the by-product fluorine compounds, chiefly fluosilicic acid ($H_2SiF_6$), from phosphate rock acidulation. Although the use of fluorine compounds, especially gaseous fluorine and hydrogen fluoride has been steadily increasing and sources of supply therefor are much sought after, the fluorine by-products from phosphate rock acidulation have been generally barred from the greater portion of this market because heretofore said by-products could not be readily divorced from silica, or the treating agents that released them from silica.

In accordance with the present invention, however, this problem has been successfully solved.

Accordingly, it is a principal object of the present invention to provide an improved process for recovering hydrogen fluoride from fluosilicic acid.

It is another object of the present invention to provide an integrated process for recovering hydrogen fluoride from fluosilicic acid, which process in addition to presenting a lower cost for raw materials, is generally simpler and more direct from the standpoint of engineering, construction and operation than prior art processes.

Other objects will in part be obvious and will in part appear hereinafter.

In accordance with the process of the present invention fluosilicic acid, in an aqueous solution, is first treated with ammonia or ammonium hydroxide to produce ammonium fluoride as expressed by the following equation:

(1) 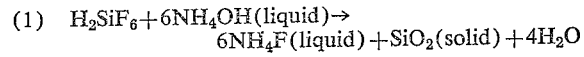
$$H_2SiF_6 + 6NH_4OH(\text{liquid}) \rightarrow 6NH_4F(\text{liquid}) + SiO_2(\text{solid}) + 4H_2O$$

The solid products of this reaction, such as $SiO_2$, are then removed by any suitable means such as by filtration, and the remaining dilute ammonium fluoride solution is subsequently evaporated to crystallize out hydrogen ammonium difluoride, as is indicated in the following equation:

(2) 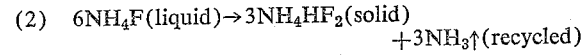
$$6NH_4F(\text{liquid}) \rightarrow 3NH_4HF_2(\text{solid}) + 3NH_3\uparrow(\text{recycled})$$

The hydrogen ammonium difluoride salt is then oxidized with oxygen or an oxygen-containing gas, such as air, to produce hydrogen fluoride, as indicated in the following equation:

(3) 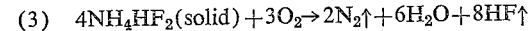
$$4NH_4HF_2(\text{solid}) + 3O_2 \rightarrow 2N_2\uparrow + 6H_2O + 8HF\uparrow$$

which hydrogen fluoride is then recovered in any convenient manner such as by being absorbed in a gas absorber in any of the many well known ways.

The treatment of the fluosilicic acid as represented by Equation 1 is preferably accomplished with at least sufficient ammonia or ammonium hydroxide to stoichiometrically react with all of said fluosilicic acid. In addition, at least some cooling of the resulting products is preferably provided as the neutralization reaction that occurs generates considerable heat.

Evaporation of the dilute ammonium fluoride solution as represented by Equation 2 is preferably accomplished at the boiling point of the solution but of course can be accomplished at higher or lower temperatures and with and without the use of higher or lower than atmospheric pressure.

The oxidation of the hydrogen ammonium difluoride salt as represented by Equation 3 is preferably accomplished at temperatures between about 100° C. and 200° C., but can be successfully accomplished at higher or lower temperatures under the proper conditions.

There follows a non-limiting illustrative example:

*Example*

While continuously cooling and stirring 1000 lbs. of 30% $H_2SiF_6$ contained in a vessel, there are added thereto 600 gallons of water and 775 lbs. of 28% aqueous $NH_3$. The resulting mixture is then filtered and the filtrate washed with 300 gallons of water. Analysis of the wet filter cake and filtrate gives the following results.

Filter cake (approx.) 2653 lbs. (water 2513 lbs.; $SiO_2$ 125 lbs.; $NH_3$ 5 lbs.; HF 10 lbs.)
Filtrate (approx.) 6722 lbs. (water 6270 lbs.; HF 240 lbs.; $NH_3$ 212 lbs.)

Next, the filtrate is heated to boiling and the fumes therefrom are caught in a water scrubber thereby recovering approximately 106 lbs. of $NH_3$ while about 32 gallons of water are distilled over. The balance of the filtrate is subsequently evaporated to dryness by being heated to a temperature of about 140° C. while being continuously swept with air. 250 lbs. of HF are recovered by water scrubbing the sweeping gas.

Obviously many changes may be made in the above-described example and procedure without departing from the scope of the invention. Accordingly, it is intended that the above disclosure be regarded as illustrative and as in no way limiting the scope of the invention.

What we claim is:

1. A process for recovering hydrogen fluoride from fluosilicic acid which comprises reacting an aqueous solution of fluosilicic acid with ammonia and recovering an ammonium fluoride solution from the resulting products, evaporating said ammonium fluoride solution to produce hydrogen ammonium difluoride and ammonia, oxidizing said hydrogen ammonium difluoride with a substance chosen from the group consisting of oxygen and oxygen-containing gas, and recovering the hydrogen fluoride produced by said oxidation reaction.

2. The process of claim 1 wherein the ammonia produced by the concentration of said ammonium fluoride is recycled and utilized in treating additional fluosilicic acid.

3. The process of claim 1 wherein the hydrogen ammonium difluoride is oxidized with air.

References Cited in the file of this patent
UNITED STATES PATENTS
2,426,557 Long et al. _____ Aug. 26, 1947
2,981,601 Kidde _____ Apr. 25, 1961

OTHER REFERENCES
J. W. Mellor's "A Comprehensive Treatise on Inorganic and Theoretical Chemistry," volume 6, 1925 edition, p. 946. Longmans, Green & Company, New York, N.Y.